(12) United States Patent
Beardsley et al.

(10) Patent No.: US 7,793,148 B2
(45) Date of Patent: Sep. 7, 2010

(54) USING VIRTUAL COPIES IN A FAILOVER AND FAILBACK ENVIRONMENT

(75) Inventors: Brent Cameron Beardsley, Tucson, AZ (US); Gregory Edward McBride, Vail, AZ (US); Robert Francis Bartfai, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 11/622,996

(22) Filed: Jan. 12, 2007

(65) Prior Publication Data
US 2008/0172572 A1 Jul. 17, 2008

(51) Int. Cl.
*G06F 11/00* (2006.01)
(52) U.S. Cl. .................................................. 714/13
(58) Field of Classification Search ............... 714/6, 714/12, 13
See application file for complete search history.

(56) References Cited

U.S. PATENT DOCUMENTS

| | | | | |
|---|---|---|---|---|
| 5,889,935 | A * | 3/1999 | Ofek et al. ............... | 714/6 |
| 6,035,412 | A | 3/2000 | Tamer et al. | |
| 6,131,148 | A | 10/2000 | West et al. | |
| 6,446,175 | B1 | 9/2002 | West et al. | |
| 6,499,112 | B1 * | 12/2002 | Milillo et al. ............ | 714/6 |
| 6,654,912 | B1 * | 11/2003 | Viswanathan et al. ...... | 714/42 |
| 6,694,447 | B1 | 2/2004 | Leach et al. | |
| 6,728,736 | B2 | 4/2004 | Hostetter et al. | |
| 6,742,138 | B1 * | 5/2004 | Gagne et al. ............. | 714/6 |
| 6,871,271 | B2 | 3/2005 | Ohran et al. | |
| 6,912,629 | B1 | 6/2005 | West et al. | |
| 6,941,490 | B2 * | 9/2005 | Ohran ...................... | 714/15 |
| 6,948,089 | B2 * | 9/2005 | Fujibayashi .............. | 714/6 |
| 7,114,094 | B2 | 9/2006 | Soejima | |
| 7,188,272 | B2 * | 3/2007 | Bartfai et al. ............ | 714/6 |

(Continued)

FOREIGN PATENT DOCUMENTS

EP 0 724 223 A 7/1996

OTHER PUBLICATIONS

W. Fischer, "Implementation of a Disaster Resilient Linux Cluster with Storage Subsystem Based Data Replication", Thesis, Jun. 2004, pp. 1-76.

(Continued)

*Primary Examiner*—Robert Beausoliel
*Assistant Examiner*—Elmira Mehrmanesh
(74) *Attorney, Agent, or Firm*—David W. Victor; Konrad Raynes & Victor LLP (57) ABSTRACT

Provided are a method, system, and article of manufacture for using virtual copies in a failover and failback environment. Updates are copied from a primary first storage at the primary site to a secondary first storage at the secondary site during system operations. A second storage is maintained at at least one of the primary and secondary sites. A failover is performed from the primary site to the secondary site after a failure at the primary site. The at least one second storage is used after recovery of the primary site to synchronize the secondary site to the primary site. Only updates made to the secondary site during the failover are copied to or from the at least one second storage in response to the recovery at the primary site.

31 Claims, 8 Drawing Sheets

U.S. PATENT DOCUMENTS

| | | | |
|---|---|---|---|
| 7,278,049 B2 * | 10/2007 | Bartfai et al. | 714/6 |
| 7,461,100 B2 * | 12/2008 | Spear et al. | 707/204 |
| 7,519,851 B2 * | 4/2009 | Kitamura | 714/6 |
| 7,627,729 B2 * | 12/2009 | Bartfai et al. | 711/162 |
| 2002/0188711 A1 | 12/2002 | Meyer et al. | |
| 2004/0034808 A1 * | 2/2004 | Day et al. | 714/6 |
| 2005/0071708 A1 * | 3/2005 | Bartfai et al. | 714/5 |
| 2005/0081091 A1 | 4/2005 | Bartfai et al. | |

OTHER PUBLICATIONS

"Disaster Recovery with General Parallel File System", IBM Corp., Aug. 2004, pp. 1-22.

R. Shanmugam, "Guidelines for Using IBM TotalStorage DS8000 Series for Oracle Database Snapshot Using the FlashCopy Advance Function", IBM Corp., Jul. 2005, pp. 1-21.

PCT International Search Report and Written Opinion dated Jun. 3, 2008 for Application No. PCT/EP2008/050032 filed Jan. 3, 2008.

EPC Communication pursuant to Article 94(3) EPC dated Oct. 30, 2009 for Application No. 08 707 825.9-2211, for IBM ref.

Response dated Feb. 15, 2010 to EPC Communication pursuant to Article 94(3) EPC dated Oct. 30, 2009 for Application No. 08 707 825.9-2211, for IBM ref.

* cited by examiner

USING VIRTUAL COPIES IN A FAILOVER AND FAILBACK ENVIRONMENT

BACKGROUND OF THE INVENTION

1. Field of the Invention

The present invention relates to a method, system, and program for using virtual copies in a failover and failback environment.

2. Description of the Related Art

In typical disaster recovery solutions, data is housed at a primary site as well as at one or more secondary sites. These secondary sites maintain a synchronized copy of the data such that a minimum of data is lost in the case of a disaster at the primary site. If a disaster occurs, processing is either "failed-over" to one of the secondary sites or the data is copied from the secondary site back to the primary site. In order for disaster recovery to be effective, the secondary sites are typically geographically distant, i.e., in different cities, states, etc., from the primary site so that both sites are not affected by the same disaster.

Disaster recovery systems typically address two types of failures, a sudden catastrophic failure at a single point in time or data loss over a period of time. In the second type of gradual disaster, updates to volumes may be lost. For either type of failure, a copy of data may be available at a remote location. Such dual or shadow copies are typically made as the application system is writing new data to a primary storage device at a primary site.

In mirroring backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary storage control unit, and the secondary volume of the pair is maintained in a secondary storage control unit at a different physical location than the primary storage control unit. A storage control unit is a physical hardware unit that consists of a storage server integrated with one or more storage devices to provide storage capability to a host computer. A storage server is a physical unit that provides an interface between one or more storage devices and a host computer by providing the function of one or more logical subsystems. The storage server may provide functions that are not provided by the storage device. The storage server is composed of one or more clusters of storage devices. A primary storage control unit may be provided to control access to the primary storage and a secondary storage control unit may be provided to control access to the secondary storage.

When two geographically dispersed server farms are used to remotely mirror data for disaster recovery capability, there arises the performance problem of reestablishing mirroring after one of the sites has been down and now recovered. In such cases, the bulk of data between the two sites is identical with a small portion that has been changed at one site and not the other during the period of one site being down. Historically, to reestablish synchronization between the sites (reestablish mirroring) one site is chosen to be considered current and then all the data is copied to the other site. Due to the amount of data to move, this mirroring operation is a very time consuming process (on the order of weeks).

Further, while maintaining a mirror copy at a secondary site, the consumer may want to make a virtual copy of the secondary mirror copy to a secondary virtual copy and then run production off the secondary virtual copy site to test and practice on the virtual copy to test the operations of the secondary site.

In certain mirroring implementations, one may have secondary volumes at a secondary site mirroring data at primary volumes at a primary site. In such case, during failure, the secondary volumes are used for production and operations, and changes are recorded during the failover to the secondary volumes. During recovery at the primary volumes, a failback is performed to copy only the changes to the secondary volumes after the failover to the primary volumes. In implementation, the user may create a virtual copy of the secondary volumes and practice on the virtual copies of the secondary volumes and still use the secondary volumes for recovery purposes. In such case, after recovery, the updates are still recovered from the main secondary volumes notwithstanding the virtual copy of the secondary volumes. This implementation requires that the recovery site has two configurations one for practice and one for recovery. Such configuration adds to complexity and increases probably of introducing errors in the event that a recovery operation is required.

In a still further mirroring implementation, to recover from the virtual copy secondary volume, the user may copy over the entire virtual copy of the secondary volume to the primary volume.

There is a need in the art for continued improvements to the failure and recovery process between primary and secondary sites.

SUMMARY

Provided are a method, system, and article of manufacture for using virtual copies in a failover and failback environment. Updates are copied from a primary first storage at the primary site to a secondary first storage at the secondary site during system operations. A second storage is maintained at at least one of the primary and secondary sites. A failover is performed from the primary site to the secondary site after a failure at the primary site. The at least one second storage is used after recovery of the primary site to synchronize the secondary site to the primary site. Only updates made to the secondary site during the failover are copied to or from the at least one second storage in response to the recovery at the primary site.

In a further embodiment, there is a secondary second storage at the secondary site and a virtual copy of the secondary first storage is made to the secondary second storage in response to the failover. A failover is performed from the secondary second storage to the primary first storage in response to making the virtual copy, wherein read and write operations are performed with respect to the secondary second storage after the failover, and wherein copying only updates made to the secondary site comprises copying the updates to the secondary second storage during the failover from the primary first storage.

In a further embodiment, the making of the virtual copy comprises establishing a point-in-time copy relationship between data units in the secondary first and second storages and copying the data indicated in the point-in-time copy relationship from the secondary first storage to the secondary second storage. A data unit at the secondary first storage is not copied to the secondary second storage if the corresponding data unit in the secondary second storage is updated before the data unit from the secondary first storage is copied to the secondary second storage.

In a further embodiment, a force failover command from the secondary second storage at the primary first storage is issued to perform the failover causing recording of updates to the secondary second storage during the failover. A force failback command from the secondary second storage to the primary first storage is issued to cause recorded updates to the secondary second storage which occurred after the force failover to be copied to the primary first storage.

In a further embodiment, data units are copied from the secondary first storage to the primary first storage after the recovery of the primary site to overwrite updates to data units in the primary first storage that occurred before the failover to the secondary site and that were not copied to the secondary first storage. The copying of updates to or from the secondary second storage to the primary first storage occurs after copying the data units from the secondary first storage to the primary first storage.

In a further embodiment, a failover command from the primary first storage to the secondary first storage is issued in response to the failure at the primary site, wherein the virtual copy is made after the failover command is performed. A failback command from the secondary first storage to the primary first storage is issued in response to the recovery of the primary site to cause the copying of the data units from the secondary first storage to overwrite the updates to the data units in the primary first storage that occurred before the failover to the secondary site and that were not copied to the secondary first storage.

In a further embodiment, there is a primary second storage at the primary site and a secondary second storage at the secondary site, wherein performing the failover comprises performing a first failover from the primary first storage to the secondary first storage. Further, a virtual copy is made of the secondary first storage to the secondary second storage in response to the failover. A second failover is performed from the secondary second storage to the primary second storage, wherein read and write operations are performed with respect to the secondary second storage after the failover. A virtual copy is made of the primary first storage to the primary second storage in response to a recovery at the primary site. Only updates made to the secondary second storage after the failover are copied to the primary second storage in response to the virtual copy to the primary second storage and in response to the recovery at the primary site.

In a further embodiment, a force failover command from the secondary second storage to the primary second storage is issued to perform the failover for the secondary second storage and further cause recording of updates to the secondary second storage after the failover. A force failback command from the secondary second storage to the primary second storage is issued to cause recorded updates to the secondary second storage after the failover to be copied to the primary second storage.

In a further embodiment, data units are copied from the secondary first storage to the primary first storage after the recovery at the primary site to overwrite updates to data units in the primary first storage that occurred before the failover and that were not copied to the secondary second storage. The virtual copy operation of the primary first storage to the primary second storage occurs in response to copying the data units from the secondary first storage to the primary first storage after the recovery at the primary site.

In a further embodiment, a failover command from the primary first storage to the secondary first storage is issued in response to the failure at the primary site. The virtual copy from the secondary first storage to the secondary second storage is made after the failover command is performed. A failback command from the secondary first storage to the primary first storage is issued in response to the recovery of the primary site to cause the copying of the data units from the secondary first storage to overwrite the updates to the data units in the primary first storage that occurred before the failover to the secondary first storage and that were not copied to the secondary site.

In a further embodiment, there is a primary second storage at the primary site. Performing the failover from the primary site to the secondary site comprises failing over to the secondary first storage from the primary first storage. Copying the updates made to the secondary site in response to the recovery comprises copying the updates made to the secondary first storage after the failure to the primary first storage from a primary storage at a primary site to a secondary site during system operation. A virtual copy of the primary first storage to a primary second storage at the primary site is made in response to the copying of the updates to the primary storage.

In a further embodiment, updates made to the secondary storage while the virtual copy was being made are copied to the primary second storage in response to the virtual copy to the primary second storage.

In a further embodiment, a failback command from the secondary first storage to the primary first storage is issued in response to the recovery at the primary site to cause the copying of the data units from the secondary first storage to overwrite the updates to the data units in the primary first storage that occurred before the failover to the secondary first storage and that were not copied to the secondary first storage. A force failback command is issued in response to completing the virtual copy from the primary first storage to the primary second storage to perform the copying of the updates while the virtual copy was being made.

DETAILED DESCRIPTION

Figure 1:
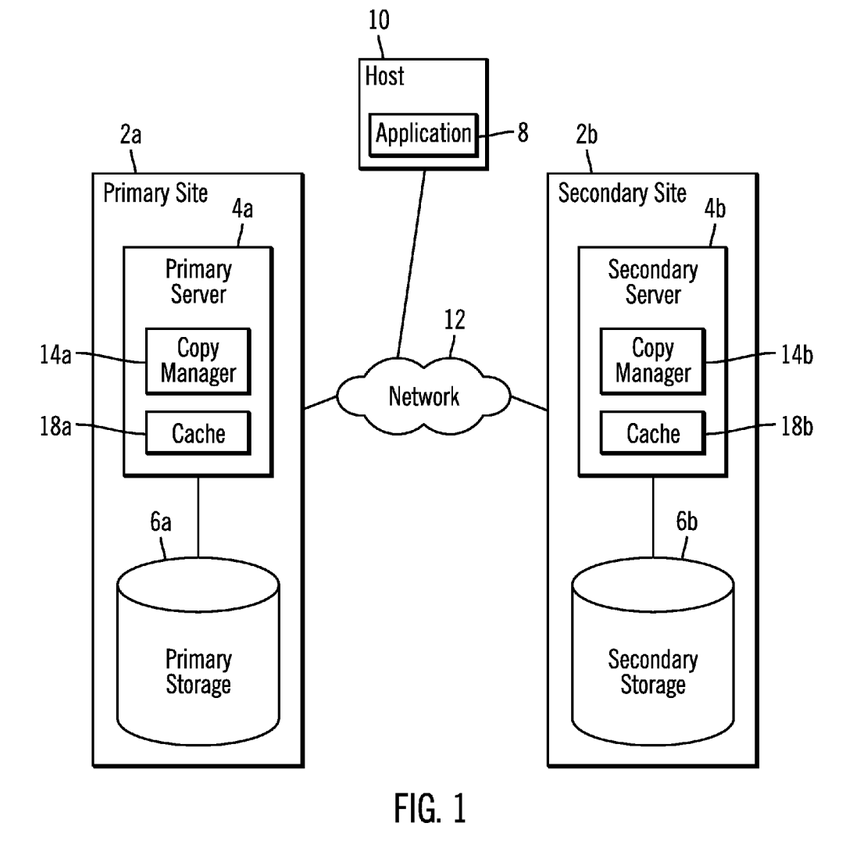
FIG. 1 illustrates an embodiment of a data mirroring computing environment.

FIG. 1 illustrates an embodiment of a network computing environment. A primary site 2a includes a primary server 4a coupled to a primary storage 6a and a secondary site 2b includes a secondary server 4b coupled to a secondary storage 6b. During normal operations, the primary server 4a receives updates and Input/Output (I/O) requests from an application 8 in a host system 10 over a network 12 (there may be multiple host systems 10 and applications 8 providing updates to the primary server 4a). At the same time, the primary server 4a mirrors data over the network 12 at the primary storage 6a to a secondary server 4b that stores the data in the secondary storage 6b. The primary 4a and secondary 4b servers include copy manager programs 14a and 14b, respectively, that manage the mirror copy operations to allow the data at the primary site 2a to be mirrored at the secondary site 2b. The copy manager programs 14a and 14b establish and maintain a copy relationship between the sites, such as a Metro Mirror or Global Mirror copy relationship offered in storage products of International Business Machines Corp., or other vendor copy relationship technology. In one embodiment, the storages 6a, 6b maintain data organized into logical units, such as volumes, Logical Unit Numbers (LUNs), which include data units, such as tracks or blocks. Further, each server 4a, 4b includes a cache 18a, 18b, comprising one or more volatile and/or non-volatile memory devices. The caches 18a, 18b cache updates received from the host 10 before the data is destaged to the storage 6a, 6b and caches data requested from the host 10.

The servers 4a, 4b may comprise enterprise storage servers, such as the IBM DS8000™ server or other suitable storage controllers known in the art. (DS8000 is a trademark of International Business Machines Corp.) The copy managers 14a, 14b comprises applications designed to coordinate the mirroring, synchronization and resynchronization of data between a primary 2a and secondary 2b sites. In the described embodiments, the copy manager 14a, 14b is also described as performing general storage management operations, such as staging and destaging data from cache 18a, 18b. Thus, in described embodiments, the copy manager 14a, 14b may include code to perform storage operations unrelated specifically to mirroring. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc. The network 12 may comprise a Storage Area Network (SAN), Local Area Network (LAN), Intranet, the Internet, Wide Area Network (WAN), peer-to-peer network, wireless network, arbitrated loop network, etc. The network 12 may include one or more switches to provide one or more paths of communication between the different network 12 elements.

FIG. 1 shows that the primary 2a and secondary 2b sites each include one server 4a, 4b coupled to storages 6a, 6b. In additional embodiments, the sites 2a, 2b may include multiple servers coupled to multiple storage systems providing server farms.

Figure 2:
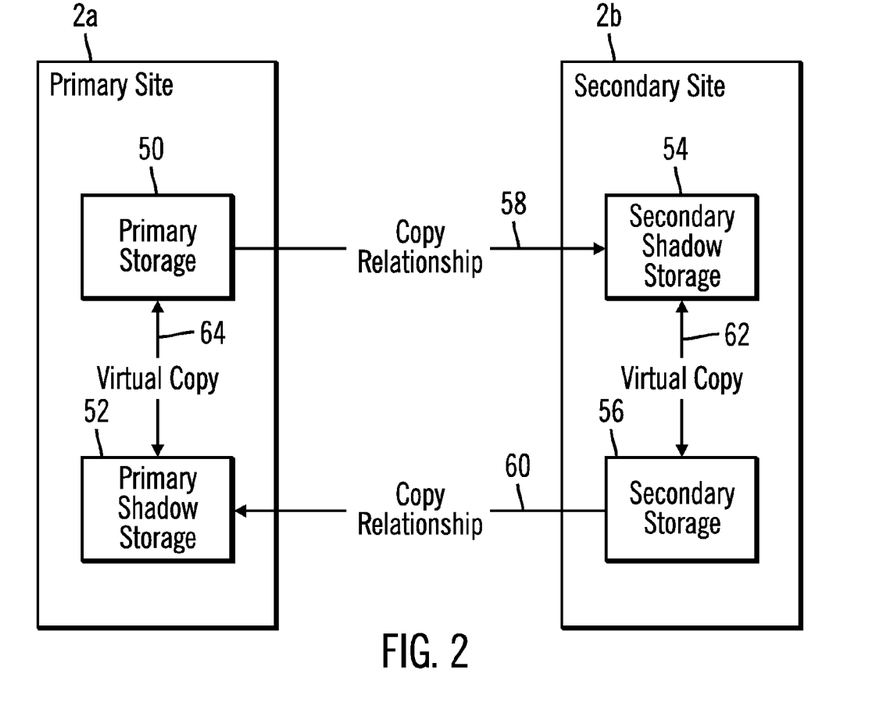
FIG. 2 illustrates an embodiment of an arrangement of storages at the primary and secondary sites.

FIG. 2 illustrates an arrangement of the storage 6a at the primary 2a as including a primary storage 50 and a primary shadow storage 52 and the storage 6b at the secondary site as including a secondary storage 54 and a secondary shadow storage 56. During normal operations, a copy relationship 58 is established between the primary storage 50 and the secondary shadow storage 54, such as a peer-to-peer or extended remote copy relationship, so that updates to the primary storage 50 are mirrored to the secondary shadow storage 54. A further copy relationship 60 is established between the secondary storage 56 and the primary shadow storage 52. Virtual copy operation 64 creates primary shadow storage 52 and virtual copy operation 62 creates the secondary storage 56.

Copy operations 58 and 60 may not be active at the same time. Copy operation 58 may be active when production is at the primary site 2a and data is being mirrored to the secondary site 2b. During a failover at the primary site 2a to secondary site 2b, copy operation 58 is suspended. Once primary site 2a recovers and is operational again, copy operation 60 may be initiated.

The virtual copy operations 62 and 64 may comprise logical point-in-time copy operations. A point-in-time copy involves physically copying all the data from source volumes to target volumes so that the target volume has a copy of the data as of a point-in-time. A point-in-time copy can also be made by logically making a copy of the data and then copying data over when necessary or in the background, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time copy relationship between primary and secondary volumes on different devices. Once the logical relationship is established, hosts may then have immediate access to data on the primary and secondary volumes, and the data may be copied as part of a background operation. The data is copied from the primary to the secondary volumes as part of a background operation. While the data is being copied over, reads to any tracks in the primary cache that have not been updated with the data from the primary storage causes the source track to be staged to the secondary cache before access is provided to the track from the secondary cache. Any reads of data on secondary tracks that have not been copied over cause the data to be copied over from the primary device to the secondary cache so that the secondary target has the copy from the source that existed at the point-in-time of the FlashCopy® operation. Further, any writes to tracks on the primary storage that have not been copied over cause the tracks on the primary storage to be copied to the secondary storage.

Figure 3:
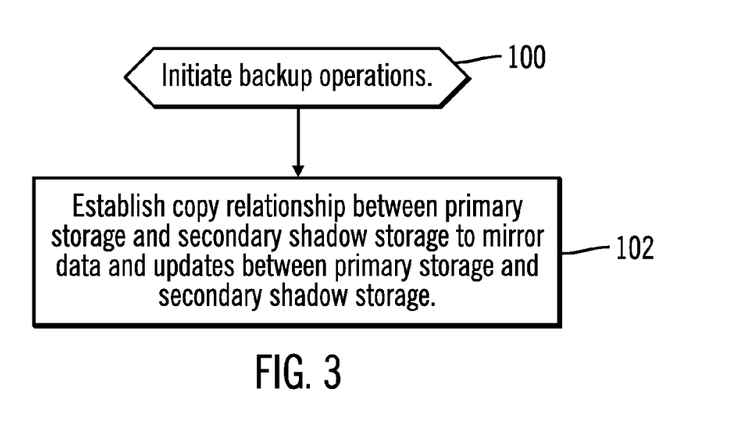
FIG. 3 illustrates an embodiment of operations to establish a copy relationship between the primary and secondary sites.

FIG. 3 illustrates an embodiment of operations implemented in the copy managers 14a and/or 14b, or in a copy management program external to the primary 4a and secondary 4b servers to mirror data at the primary storage 50 to the secondary shadow storage 56. In response to initiating backup operations (at block 100), copy relationship 58 is established (at block 102) between the primary storage 50 and secondary shadow storage 54 to mirror data and updates to the primary storage 50.

Figure 4:
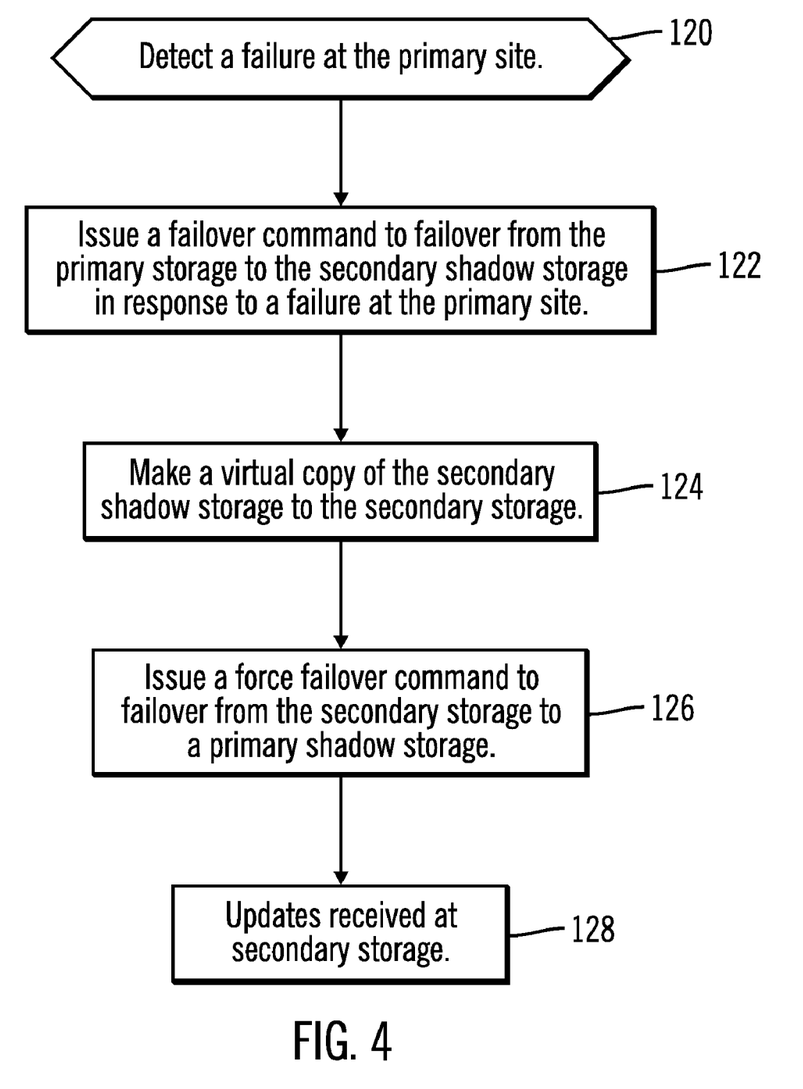
FIG. 4 illustrates an embodiment of operations to handle a failure at the primary site with respect to the storage arrangement of FIG. 2.

FIG. 4 illustrates an embodiment of operations implemented in the copy managers 14a and/or 14b, or in a copy management program external to the primary 4a and secondary 4b servers in response to detecting a failure (at block 120) at the primary site 2a. In response, a failover command is issued (at block 122) to failover from the primary storage 50 to the secondary shadow storage 54 in response to a failure at the primary site 2a. In response, a virtual copy 62 of the secondary shadow storage 54 is made (at block 124) to the secondary storage 56. Further, a force failover command is issued (at block 126) to failover from the secondary storage 56 to a primary shadow storage 52. Both failover commands at blocks 122 and 126 cause the secondary site storages 54 and 56 to maintain a change record bitmap to indicate data units, e.g., tracks, updated after the failover. Host operations are started (at bock 128) on the secondary site 2b using the secondary storage 56 after the failover, where such changes are reflected in the change record bitmap for the secondary storage 56. In this way, production is practiced on the virtual copy secondary storage 56.

Figure 5:
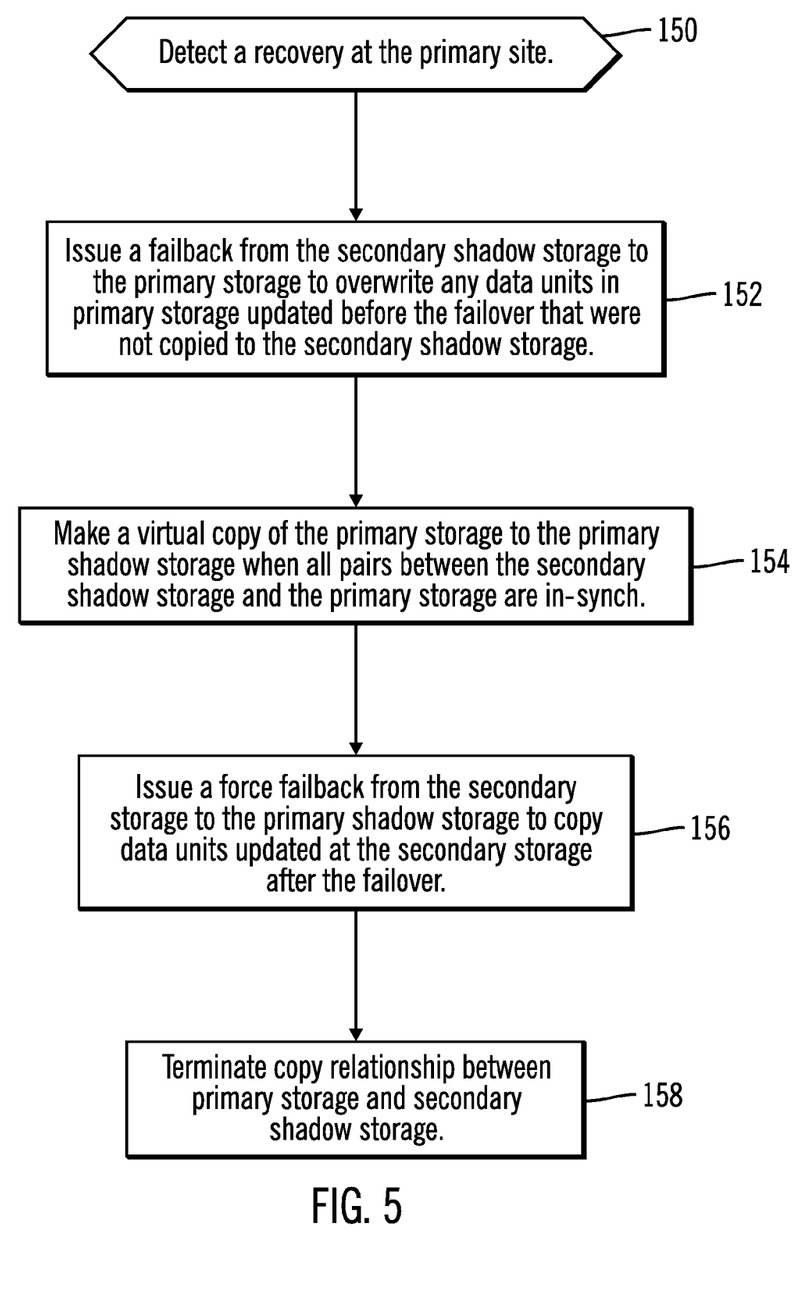
FIG. 5 illustrates an embodiment of operations to handle a recovery at the primary site with respect to the storage arrangement of FIG. 2.

FIG. 5 illustrates an embodiment of operations implemented in the copy managers 14*a* and/or 14*b*, or in a copy management program external to the primary 4*a* and secondary 4*b* servers to handle a recovery at the primary site 2*a*. In response to detecting (at block 150) a recovery at the primary site 2*a*, a failback command from the secondary shadow storage 54 to the primary storage 50 is issued (at block 152) to overwrite any data units in primary storage 50 updated before the failover that were not copied to the secondary shadow storage 54 to synchronize the primary 50 and secondary shadow 54 storages. After all pairs are synchronized from the secondary shadow storage 54 to the primary storage 50, a virtual copy 64 is made (at block 154) of the primary storage 50 to the primary shadow storage 52. A force failback command is issued (at block 156) from the secondary storage 56 to the primary shadow storage 52 to copy data units updated at the secondary storage 56 after the failover that were recorded by the secondary storage 56 before the copy relationship 60 is established. The copy relationship 58 is terminated (at block 158) between the primary storage 50 and the secondary shadow storage 54.

In an alternative recovery embodiment, operations may be switched to the secondary site 2*b* after the primary site 2*a* recovers. This may be accomplished by synchronizing the primary shadow storage 52 to the secondary shadow storage 56 after recovery. After the primary site 2*a* is back in synchronization, operations continue at the primary site 2*a* unaffected and the practice session may continue on secondary storage 56 without effecting host operations with respect to the primary site. Further, mirroring continues from primary storage 50 to secondary shadow storage 54.

With the described embodiments of FIGS. 2-5, the customer may run production on both sites, and protection is provided in both locations. Further, with the described embodiments, only changed updates are copied from the secondary storage 56 produced as the result of a virtual copy operation, where the secondary shadow storage 54 maintains the data at the time of the failover. The virtual copy volume, i.e., secondary storage 56, is used to record changes and only the recorded changes are copied from the virtual copy volume back to the primary site as a result of a failback. This situation result may be accomplished by performing a force failover from the virtual copy volume (secondary storage 56) to the primary shadow volume 52 before the copy relationship 60 is established, which causes the virtual copy volume (secondary storage 56) to record change updates during the failover so that only the recorded changes are copied during the failback. The failback from the secondary shadow storage 54 to the primary storage 50 is performed to remove any updates received at the primary storage 50 that were not copied to the secondary shadow storage 54 before the failover to synchronize the primary storage 50 to the secondary shadow storage 54. Applying the recorded changes at the secondary virtual copy volume 56 to the primary virtual copy (primary shadow storage 52) including the data synchronized to the primary storage 50 ensures that the failback to the primary shadow storage 52 synchronizes the secondary site 2*b* to the primary site 2*a*. Moreover, the embodiments of FIGS. 2-5 provide a symmetric configuration so that the secondary site 2*b* can function as the primary site and the primary site 2*a* may function as the secondary site with respect to the operations of FIGS. 3-5, i.e., host operations can run on site 2*b*, mirroring from sites 2*b* to 2*a*, failover from site 2*b* to site 2*a*, and then recovery and resynchronize from site 2*a* to site 2*b*.

Figure 6:
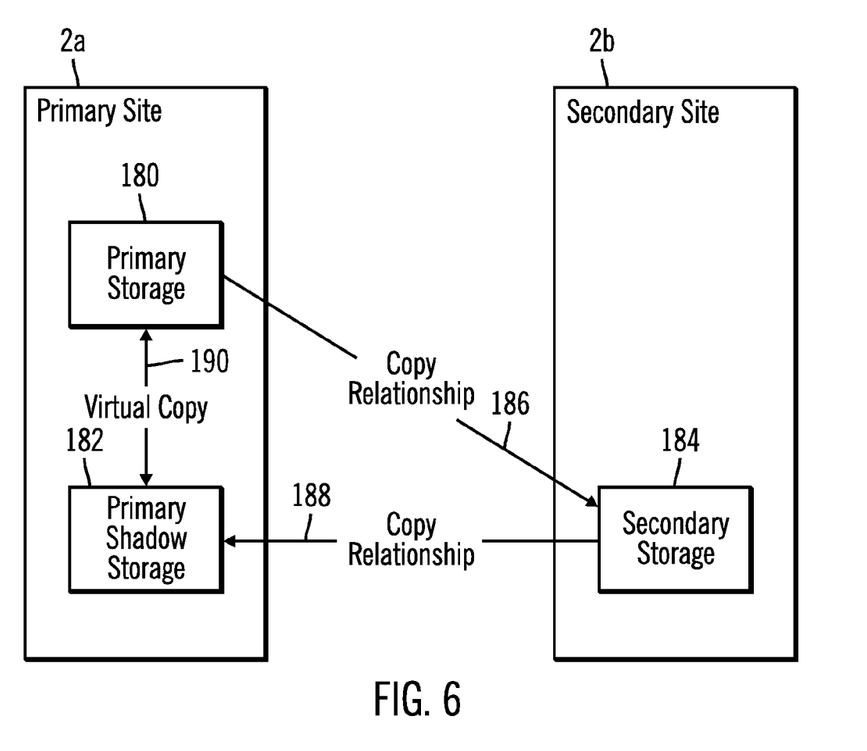
FIG. 6 illustrates an embodiment of an arrangement of storages at the primary and secondary sites.

FIG. 6 illustrates an embodiment of the storage 6*a* at the primary site 2*a* as including a primary storage 180 and a primary shadow storage 182 and the storage 6*b* at the secondary site 2*b* as including a secondary storage 184. During normal operations, a copy relationship 186 is established between the primary storage 180 and the secondary storage 184, such as a peer-to-peer or extended remote copy relationship, so that updates to the primary storage 180 are mirrored to the secondary storage 184. A further copy relationship 188 is established between the secondary storage 56 and the primary shadow storage 58 after recovery at the primary site 2*a* to copy data from secondary storage 184 to primary shadow storage 182. A virtual copy operation 190 creates primary shadow storage 182. The virtual copy operations 190 may comprise a logical point-in-time copy operation as discussed with respect to FIG. 2.

Figure 7:
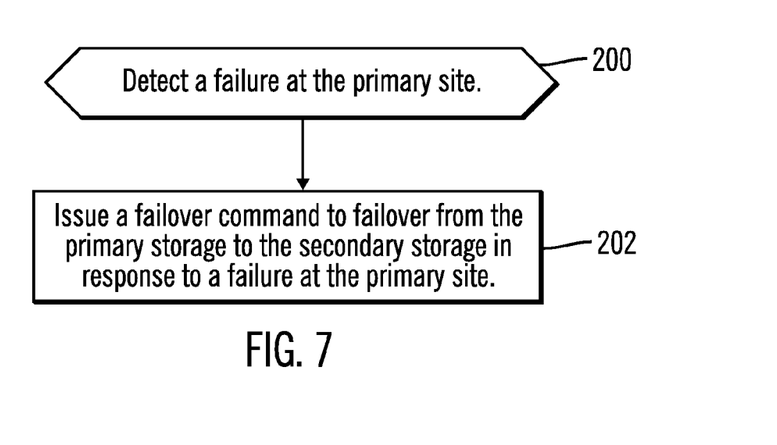
FIG. 7 illustrates an embodiment of operations to handle a failure at the primary site with respect to the storage arrangement of FIG. 6.

FIG. 7 illustrates an embodiment of operations implemented in the copy managers 14*a* and/or 14*b*, or in a copy management program external to the primary 4*a* and secondary 4*b* servers in response to detecting a failure (at block 200) at the primary site 2*a*. In response, a failover command is issued (at block 202) from the primary storage 180 to the secondary storage 184. As a result of the failover, read and writes are performed at the secondary storage 184 which records any changes during the failover pursuant to the copy relationship 186.

Figure 8:
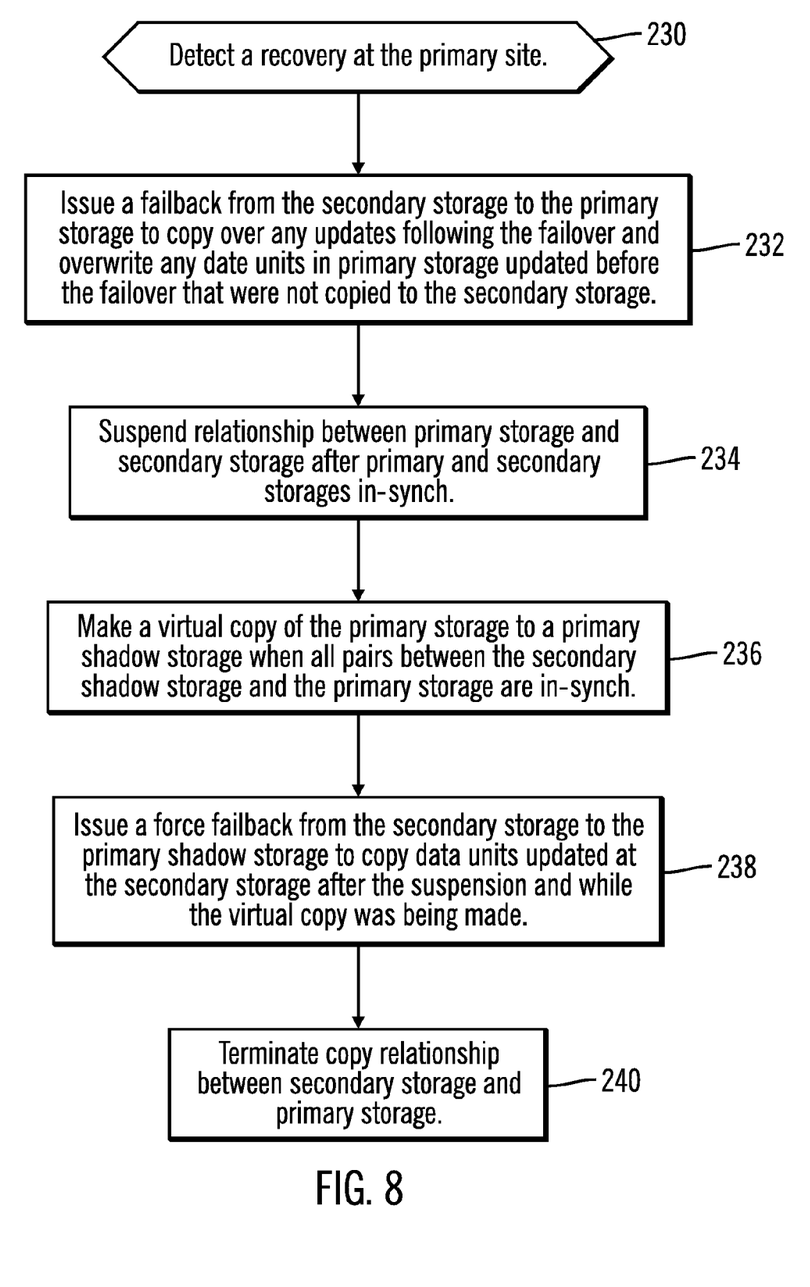
FIG. 8 illustrates an embodiment of operations to handle a recovery at the primary site with respect to the storage arrangement of FIG. 6.

FIG. 8 illustrates an embodiment of operations implemented in the copy managers 14*a* and/or 14*b*, or in a copy management program external to the primary 4*a* and secondary 4*b* servers to handle a recovery at the primary site 2*a*. In response to detecting (at block 230) a recovery at the primary site 2*a*, a failback is issued (at block 232) from the secondary storage 184 to the primary storage 180 to copy over any updates following the failover and overwrite any data units in the primary storage 180 updated before the failover that were not copied to the secondary storage 184. After the secondary storage 184 is synchronized to the primary storage 180, the copy relationship 186 is terminated (at block 234). A virtual copy 190 of the synchronized primary storage 180 is made (at block 236) to the primary shadow storage 182. A force failback is then issued (at block 238) from the secondary storage 184 to the primary shadow storage 182 to copy data units updated at the secondary storage 184 after the suspension and while the virtual copy 182 was being made. After the primary shadow storage 182 is updated, the copy relationship 188 between the secondary storage 184 and primary storage 180 is terminated (at block 240).

With the operations of FIGS. 6-8, the failback to primary storage 180 copies changed updates from the secondary storage 184 to the primary storage 180 that are recorded as a result of the failover and copy relationship 184. Further, while the virtual copy 190 operation is being performed, the secondary storage 184 continues to record changes and activity to the secondary storage 184. These updates are then copied to the primary shadow storage 182. After the copy relationship 188 is terminated, production may be run on the primary shadow storage 182.

Figure 9:
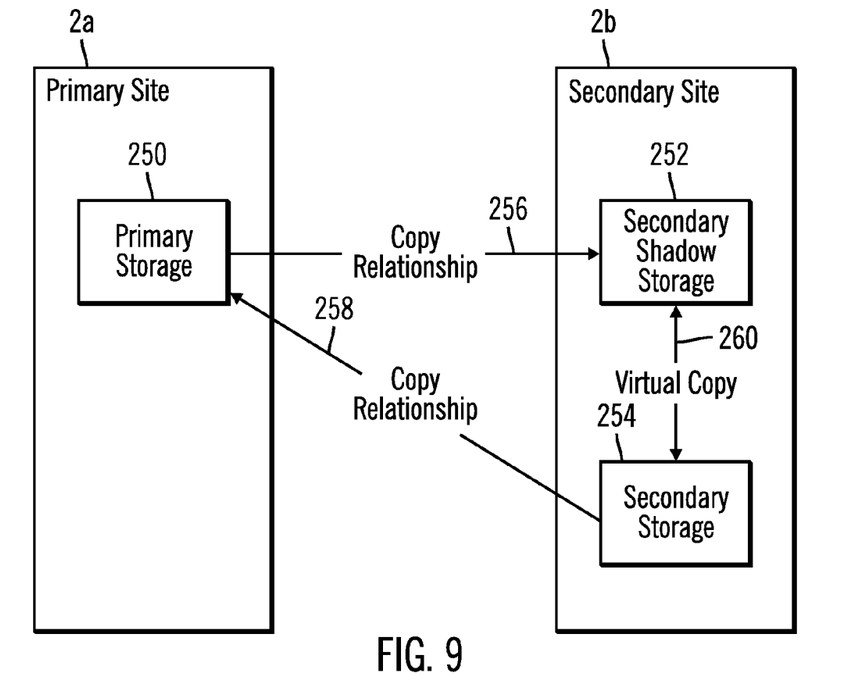
FIG. 9 illustrates an embodiment of an arrangement of storages at the primary and secondary sites.

FIG. 9 illustrates an embodiment of the storage 6*a* at the primary site 2*a* as including a primary storage 250 and the storage 6*b* at the secondary site 2*b* as including a secondary shadow storage 252 and secondary storage 254. During normal operations, a copy relationship 256 is established between the primary storage 250 and the secondary shadow storage 252, such as a peer-to-peer or extended remote copy relationship, so that updates to the primary storage 250 are mirrored to the secondary storage 252. A further copy relationship 258 is established from the secondary storage 254 to the primary storage 250. A virtual copy operation 260 creates a secondary storage 254. The virtual copy operation 260 may comprise a logical point-in-time copy operation as discussed with respect to FIG. 2.

Figure 10:
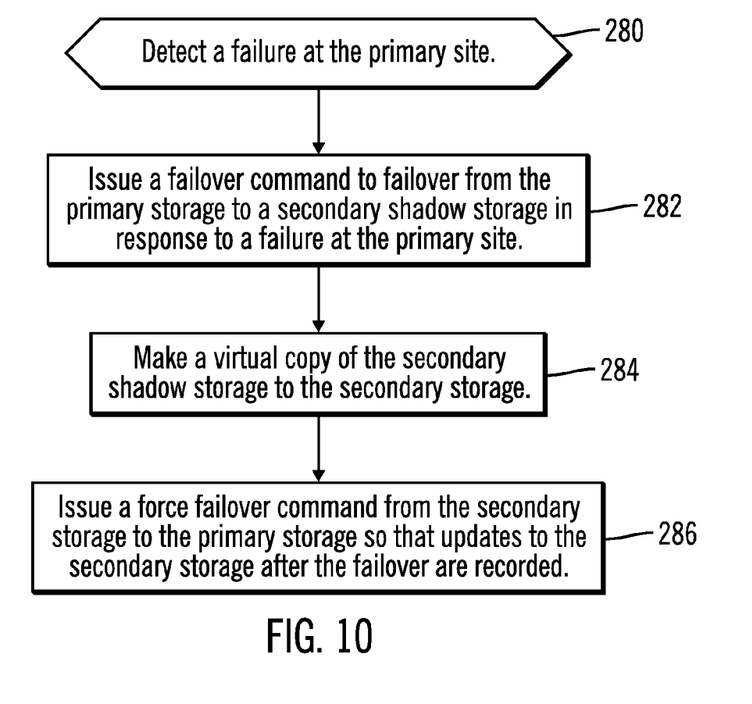
FIG. 10 illustrates an embodiment of operations to handle a failure at the primary site with respect to the storage arrangement of FIG. 9.

FIG. 10 illustrates an embodiment of operations implemented in the copy managers 14a and/or 14b, or in a copy management program external to the primary 4a and secondary 4b servers in response to detecting a failure at the primary site 2a. In response to the failure (at block 280), a failover command is issued (at block 282) to failover from the primary storage 250 to the secondary shadow storage 252. This causes the secondary shadow storage 252 to maintain a record bitmap for any changes. A virtual copy is made (at block 284) of the secondary shadow storage 252 to the secondary storage 254 and a force failover command is issued (at block 286) from the secondary storage 254 to the primary storage so that updates to the secondary storage 254 after the failover are recorded. The force failover established the copy relationship 258 that enables the secondary storage 254 to record changes after the failover. After the failover, production is continued at the secondary site 2b with respect to the secondary storage 254.

Figure 11:
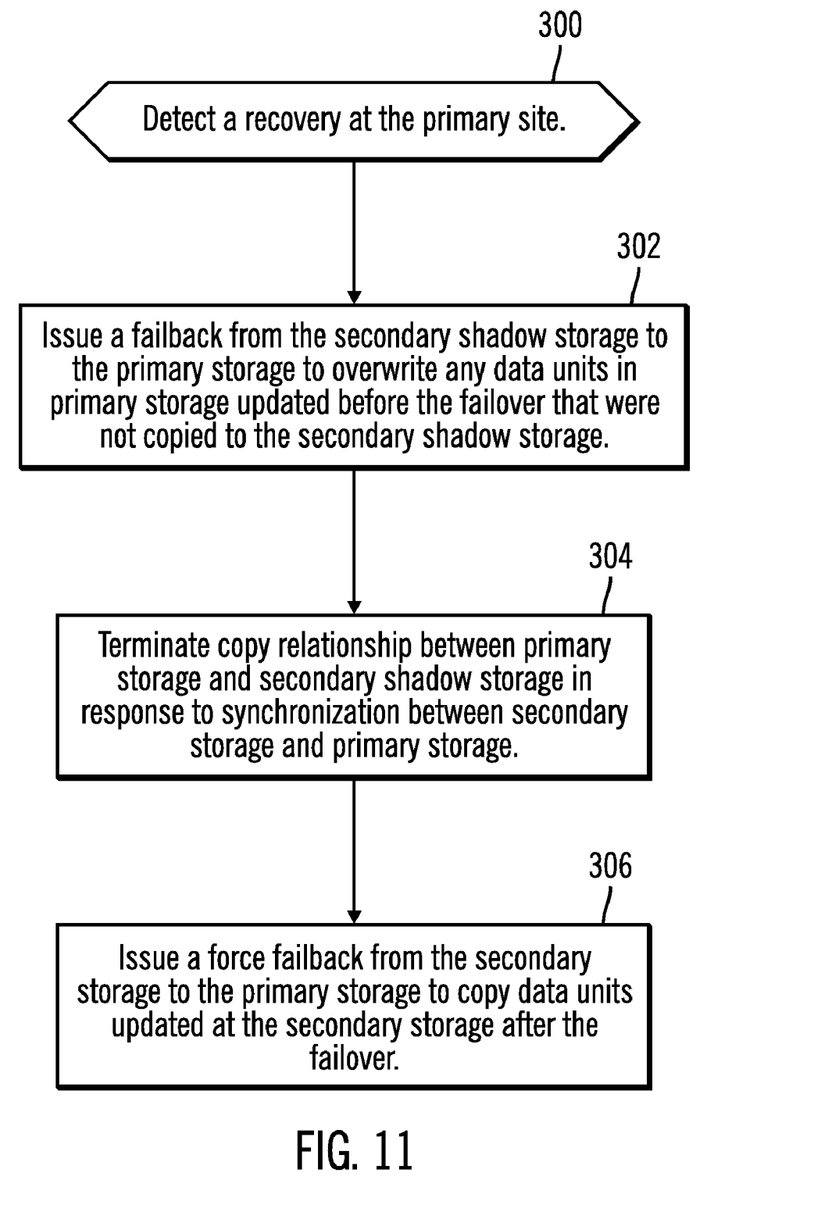
FIG. 11 illustrates an embodiment of operations to handle a recovery at the primary site with respect to the storage arrangement of FIG. 9.

FIG. 11 illustrates an embodiment of operations implemented in the copy managers 14a and/or 14b, or in a copy management program external to the primary 4a and secondary 4b servers to handle a recovery at the primary site 2a. In response to detecting (at block 300) a recovery at the primary site 2a, a failback is issued (at block 302) from the secondary shadow storage 252 to the primary storage 254 to overwrite any data units in the primary storage 250 updated before the failover that were not copied to the secondary shadow storage 252. After the primary storage 250 is synchronized to the secondary shadow storage 252, the copy relationship 256 between the primary storage 250 and the secondary shadow storage 252 is terminated (at block 304). A force failback is issued (at block 306) from the secondary storage 254 to the primary storage 250 to copy data units updated at the secondary storage 254 after the failover and recorded as part of the copy relationship 258 established by the force failover.

With the operations of FIGS. 9-11, the failback to primary storage 250 copies changed updates from the virtual copy secondary storage 254 to the primary storage 250 that are recorded as a result of the force failover and copy relationship 258. After the primary storage 250 is synchronized with the virtual copy secondary storage 254, the secondary storage 254 may become the primary storage 180 in FIG. 6 and the secondary shadow storage 252 operate as the primary shadow storage 182 in FIG. 6, where the primary storage 250 will function as the secondary storage 184 in FIG. 6. Thus, after the synchronization, production may continue on the secondary storage 254 by making the secondary site 2b in FIG. 9 operate as the primary site 2a in FIG. 6.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices and components that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3-5, 7-9, 10, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for synchronizing data between a primary site and a secondary site, comprising:
    copying updates from a primary first storage at the primary site to a secondary first storage at the secondary site during system operations;
    maintaining at least one second storage comprising a secondary storage at the secondary site;
    performing a failover from the primary site to the secondary site after a failure at the primary site;
    making a virtual copy of the secondary first storage to the secondary second storage in response to the failover;
    performing a failover from the secondary second storage to the primary first storage in response to making the virtual copy, wherein read and write operations are performed with respect to the secondary second storage after the failover, and wherein copying only updates made to the secondary site comprises copying the updates to the secondary second storage during the failover from the primary first storage; and
    in response to a recovery at the primary site, performing:
        copying data from the secondary first storage to overwrite data units at the primary first storage updated before the failover that were not copied to the secondary first storage; and
        using the at least one second storage after recovery to copy only updates made to the secondary site after the failover.

2. The method of claim 1, wherein the making of the virtual copy comprises:
    establishing a point-in-time copy relationship between data units in the secondary first and second storages; and
    copying the data indicated in the point-in-time copy relationship from the secondary first storage to the secondary second storage, wherein a data unit at the secondary first storage is not copied to the secondary second storage if the corresponding data unit in the secondary second storage is updated before the data unit from the secondary first storage is copied to the secondary second storage.

3. The method of claim 1, further comprising:
    issuing a force failover command from the secondary second storage to the primary first storage to perform the failover causing recording of updates to the secondary second storage during the failover; and
    issuing a force failback command from the secondary second storage to the primary first storage to cause recorded updates to the secondary second storage which occurred after the force failover to be copied to the primary first storage.

4. The method of claim 1,
    wherein using the at least one second storage after recovery to copy the updates occurs after copying the data units from the secondary first storage to the primary first storage.

5. The method of claim 4, further comprising:
    issuing a failover command from the primary first storage to the secondary first storage in response to the failure at the primary site, wherein the virtual copy is made after the failover command is performed; and
    issuing a failback command from the secondary first storage to the primary first storage in response to the recovery of the primary site to cause the copying of the data units from the secondary first storage to overwrite the updates to the data units in the primary first storage that occurred before the failover to the secondary site and that were not copied to the secondary first storage.

6. The method of claim 1, wherein the at least one second storage comprises a primary second storage at the primary site, wherein performing the failover from the primary site to the secondary site comprises failing over to the secondary first storage from the primary first storage, wherein copying the updates made to the secondary site in response to the recovery comprises copying the updates made to the secondary first storage after the failure to the primary first storage from a primary storage at a primary site to a secondary site during system operation, further comprising:
    making a virtual copy of the primary first storage to a primary second storage at the primary site in response to the copying of the updates to the primary storage.

7. The method of claim 6, further comprising:
    copying updates made to the secondary storage while the virtual copy was being made to the primary second storage in response to the virtual copy to the primary second storage.

8. The method of claim 7, further comprising:
    issuing a failback command from the secondary first storage to the primary first storage in response to the recovery at the primary site to cause the copying of the data units from the secondary first storage to overwrite the updates to the data units in the primary first storage that occurred before the failover to the secondary first storage and that were not copied to the secondary first storage; and
    issuing a force failback command in response to completing the virtual copy from the primary first storage to the primary second storage to perform the copying of the updates while the virtual copy was being made.

9. A method for synchronizing data between a primary site and a secondary site, comprising:
    copying updates from a primary first storage at the primary site to a secondary first storage at the secondary site during system operations;

maintaining at least one second storage comprising a primary second storage at the primary site and a secondary second storage at the secondary site;

performing a first failover from the primary first storage to the secondary first storage after a failure at the primary site;

making a virtual copy of the secondary first storage to the secondary second storage in response to the failover;

performing a second failover from the secondary second storage to the primary second storage, wherein read and write operations are performed with respect to the secondary second storage after the failover; and in response to a recovery at the primary site, performing:
  copying data from the secondary first storage to overwrite data units at the primary first storage updated before the failover that were not copied to the secondary first storage;
  using the at least one second storage after recovery to copy only updates made to the secondary site after the failover;
  making a virtual copy of the primary first storage to the primary second storage; and
  copying only updates made to the secondary second storage after the failover to the primary second storage in response to the virtual copy to the primary second storage and in response to the recovery at the primary site.

10. The method of claim 9, further comprising:
issuing a force failover command from the secondary second storage to the primary second storage to perform the failover for the secondary second storage and further cause recording of updates to the secondary second storage after the failover; and
issuing a force failback command from the secondary second storage to the primary second storage to cause recorded updates to the secondary second storage after the failover to be copied to the primary second storage.

11. The method of claim 9,
wherein the virtual copy operation of the primary first storage to the primary second storage occurs in response to copying the data units from the secondary first storage to the primary first storage after the recovery at the primary site.

12. The method of claim 11, further comprising:
issuing a failover command from the primary first storage to the secondary first storage in response to the failure at the primary site, wherein the virtual copy from the secondary first storage to the secondary second storage is made after the failover command is performed; and
issuing a failback command from the secondary first storage to the primary first storage in response to the recovery of the primary site to cause the copying of the data units from the secondary first storage to overwrite the updates to the data units in the primary first storage that occurred before the failover to the secondary first storage and that were not copied to the secondary site.

13. A system for synchronizing data between a primary site and a secondary site, wherein the primary site has a primary first storage, wherein the secondary site has a secondary first storage, and wherein at least one second storage comprises a secondary storage at the secondary site comprising:
a copy manager component enabled to cause operations to be performed the operations comprising:
  copying updates from the primary first storage at the primary site to the secondary first storage at the secondary site during system operations;
  performing a failover from the primary site to the secondary site after a failure at the primary site;
  making a virtual copy of the secondary first storage to the secondary second storage in response to the failover;
  performing a failover from the secondary second storage to the primary first storage in response to making the virtual copy, wherein read and write operations are performed with respect to the secondary second storage after the failover, and wherein copying only updates made to the secondary site comprises copying the updates to the secondary second storage during the failover from the primary first storage; and
  in response to a recovery at the primary site, performing:
    copying data from the secondary first storage to overwrite data units at the primary first storage updated before the failover that were not copied to the secondary first storage; and
    using the at least one second storage after recovery to copy only updates made to the secondary site after the failover.

14. The system of claim 13, wherein the making of the virtual copy comprises:
establishing a point-in-time copy relationship between data units in the secondary first and second storages; and
copying the data indicated in the point-in-time copy relationship from the secondary first storage to the secondary second storage, wherein a data unit at the secondary first storage is not copied to the secondary second storage if the corresponding data unit in the secondary second storage is updated before the data unit from the secondary first storage is copied to the secondary second storage.

15. The system of claim 13, wherein the operations further comprise:
issuing a force failover command from the secondary second storage to the primary first storage to perform the failover causing recording of updates to the secondary second storage during the failover; and
issuing a force failback command from the secondary second storage to the primary first storage to cause recorded updates to the secondary second storage which occurred after the force failover to be copied to the primary first storage.

16. The system of claim 13, wherein there is a primary second storage at the primary site, wherein performing the failover from the primary site to the secondary site comprises failing over to the secondary first storage from the primary first storage, wherein copying the updates made to the secondary site in response to the recovery comprises copying the updates made to the secondary first storage after the failure to the primary first storage from a primary storage at a primary site to a secondary site during system operations, wherein the operations further comprise:
making a virtual copy of the primary first storage to a primary second storage at the primary site in response to the copying of the updates to the primary storage.

17. The system of claim 16, wherein the operations further comprise:
copying updates made to the secondary storage while the virtual copy was being made to the primary second storage in response to the virtual copy to the primary second storage.

18. A system for synchronizing data between a primary site and a secondary site, wherein the primary site has a primary first storage, wherein the secondary site has a secondary first storage, and wherein at least one second storage comprises a primary second storage at the primary site and a secondary second storage at the secondary site, comprising:
- a copy manager component enabled to cause operations to be performed the operations comprising:
  - copying updates from the primary first storage at the primary site to the secondary first storage at the secondary site during system operations;
  - performing a first failover from the primary first storage to the secondary first storage after a failure at the primary site;
  - making a virtual copy of the secondary first storage to the secondary second storage in response to the failover;
  - performing a second failover from the secondary second storage to the primary second storage, wherein read and write operations are performed with respect to the secondary second storage after the failover; and
  - in response to a recovery at the primary site, performing:
    - copying data from the secondary first storage to overwrite data units at the primary first storage updated before the failover that were not copied to the secondary first storage;
    - using the at least one second storage after recovery to copy only updates made to the secondary site after the failover;
    - making a virtual copy of the primary first storage to the primary second storage; and
    - copying only updates made to the secondary second storage after the failover to the primary second storage in response to the virtual copy to the primary second storage and in response to the recovery at the primary site.

19. The system of claim 18, wherein the operations further comprise:
- issuing a force failover command from the secondary second storage to the primary second storage to perform the failover for the secondary second storage and further cause recording of updates to the secondary second storage after the failover; and
- issuing a force failback command from the secondary second storage to the primary second storage to cause recorded updates to the secondary second storage after the failover to be copied to the primary second storage.

20. An article of manufacture comprising a computer readable storage medium including code to cause operations with respect to a primary first storage at a primary site, a secondary first storage at a secondary site, and at least one second storage comprising a secondary storage at the secondary site, wherein the operations comprise:
- copying updates from the primary first storage at the primary site to the secondary first storage at the secondary site during system operations;
- performing a failover from the primary site to the secondary site after a failure at the primary site;
- making a virtual copy of the secondary first storage to the secondary second storage in response to the failover;
- performing a failover from the secondary second storage to the primary first storage in response to making the virtual copy, wherein read and write operations are performed with respect to the secondary second storage after the failover, and wherein copying only updates made to the secondary site comprises copying the updates to the secondary second storage during the failover from the primary first storage; and
- in response to a recovery at the primary site, performing:
  - copying data from the secondary first storage to overwrite data units at the primary first storage updated before the failover that were not copied to the secondary first storage; and
  - using the at least one second storage after recovery to copy only updates made to the secondary site after the failover.

21. The article of manufacture of claim 20, wherein the making of the virtual copy comprises:
- establishing a point-in-time copy relationship between data units in the secondary first and second storages; and
- copying the data indicated in the point-in-time copy relationship from the secondary first storage to the secondary second storage, wherein a data unit at the secondary first storage is not copied to the secondary second storage if the corresponding data unit in the secondary second storage is updated before the data unit from the secondary first storage is copied to the secondary second storage.

22. The article of manufacture of claim 20, wherein the operations further comprise:
- issuing a force failover command from the secondary second storage to the primary first storage to perform the failover causing recording of updates to the secondary second storage during the failover; and
- issuing a force failback command from the secondary second storage to the primary first storage to cause recorded updates to the secondary second storage which occurred after the force failover to be copied to the primary first storage.

23. The article of manufacture of claim 20, wherein using the at least one second storage after recovery to copy the updates occurs after copying the data units from the secondary first storage to the primary first storage.

24. The article of manufacture of claim 23, wherein the operations further comprise:
- issuing a failover command from the primary first storage to the secondary first storage in response to the failure at the primary site, wherein the virtual copy is made after the failover command is performed; and
- issuing a failback command from the secondary first storage to the primary first storage in response to the recovery of the primary site to cause the copying of the data units from the secondary first storage to overwrite the updates to the data units in the primary first storage that occurred before the failover to the secondary site and that were not copied to the secondary first storage.

25. The article of manufacture of claim 20, wherein the at least one second storage comprises a primary second storage at the primary site, wherein performing the failover from the primary site to the secondary site comprises failing over to the secondary first storage from the primary first storage, wherein copying the updates made to the secondary site in response to the recovery comprises copying the updates made to the secondary first storage after the failure to the primary first storage from a primary storage at a primary site to a secondary site during system operation, further comprising:
- making a virtual copy of the primary first storage to a primary second storage at the primary site in response to the copying of the updates to the primary storage.

26. The article of manufacture of claim 25, further comprising:
- copying updates made to the secondary storage while the virtual copy was being made to the primary second storage in response to the virtual copy to the primary second storage.

27. The article of manufacture of claim 26, further comprising:
- issuing a failback command from the secondary first storage to the primary first storage in response to the recovery at the primary site to cause the copying of the data units from the secondary first storage to overwrite the updates to the data units in the primary first storage that occurred before the failover to the secondary first storage and that were not copied to the secondary first storage; and
- issuing a force failback command in response to completing the virtual copy from the primary first storage to the primary second storage to perform the copying of the updates while the virtual copy was being made.

28. An article of manufacture comprising a computer readable storage medium including code to cause operations with respect to a primary first storage at a primary site, a secondary first storage at a secondary site, and at least one second storage comprising a primary second storage at the primary site and a secondary second storage at the secondary site, wherein the operations comprise:
- copying updates from the primary first storage at the primary site to the secondary first storage at the secondary site during system operations;
- performing a first failover from the primary first storage to the secondary first storage after a failure at the primary site;
- making a virtual copy of the secondary first storage to the secondary second storage in response to the failover;
- performing a second failover from the secondary second storage to the primary second storage, wherein read and write operations are performed with respect to the secondary second storage after the failover; and
- in response to a recovery at the primary site, performing:
  - copying data from the secondary first storage to overwrite data units at the primary first storage updated before the failover that were not copied to the secondary first storage;
  - using the at least one second storage after recovery to copy only updates made to the secondary site after the failover;
  - making a virtual copy of the primary first storage to the primary second storage; and
  - copying only updates made to the secondary second storage after the failover to the primary second storage in response to the virtual copy to the primary second storage and in response to the recovery at the primary site.

29. The article of manufacture of claim 28, wherein the operations further comprise:
- issuing a force failover command from the secondary second storage to the primary second storage to perform the failover for the secondary second storage and further cause recording of updates to the secondary second storage after the failover; and
- issuing a force failback command from the secondary second storage to the primary second storage to cause recorded updates to the secondary second storage after the failover to be copied to the primary second storage.

30. The article of manufacture of claim 28,
wherein the virtual copy operation of the primary first storage to the primary second storage occurs in response to copying the data units from the secondary first storage to the primary first storage after the recovery at the primary site.

31. The article of manufacture of claim 30, further comprising:
- issuing a failover command from the primary first storage to the secondary first storage in response to the failure at the primary site, wherein the virtual copy from the secondary first storage to the secondary second storage is made after the failover command is performed; and
- issuing a failback command from the secondary first storage to the primary first storage in response to the recovery of the primary site to cause the copying of the data units from the secondary first storage to overwrite the updates to the data units in the primary first storage that occurred before the failover to the secondary first storage and that were not copied to the secondary site.

* * * * *